United States Patent [19]

Gerlach

[11] Patent Number: 5,491,487
[45] Date of Patent: Feb. 13, 1996

[54] SLAVED GRAM SCHMIDT ADAPTIVE NOISE CANCELLATION METHOD AND APPARATUS

[75] Inventor: Karl R. Gerlach, Dunkirk, Md.

[73] Assignee: The United States of America as represented by the Secretary of the Navy, Washington, D.C.

[21] Appl. No.: 707,480

[22] Filed: May 30, 1991

[51] Int. Cl.⁶ ................................................ G01S 3/32
[52] U.S. Cl. .......................... 342/378; 342/383; 342/384
[58] Field of Search ............................ 342/17, 378–384, 342/159, 160, 162

[56] References Cited

U.S. PATENT DOCUMENTS

| | | | |
|---|---|---|---|
| H14 | 1/1986 | Lewis . | |
| H92 | 7/1986 | Kretschmer, Jr. et al. . | |
| H1005 | 12/1991 | Gerlach | 342/378 |
| 4,398,197 | 8/1983 | Dillard . | |
| 4,577,193 | 3/1986 | Kiuchi et al. | 343/380 |
| 4,652,881 | 3/1987 | Lewis | 342/160 |
| 4,688,187 | 8/1987 | McWhirter | 342/381 |
| 4,780,721 | 10/1988 | Dobson | 342/383 |

OTHER PUBLICATIONS

Karl Gerlach, "A Systolic, Multiple–Channel, Band–Partitioned Noise Canceller," Jun. 14, 1990, Washington, D.C. NRL Report No. 9225.
Karl Gerlach, "A Numerically Efficient Band–Partitioned Noise Canceller," Jun. 29, 1987, Washington, D.C., NRL Report No. 9050.

*Primary Examiner*—Gilberto Barron, Jr.
*Attorney, Agent, or Firm*—Thomas E. McDonnell; Edward F. Miles

[57] ABSTRACT

A method and apparatus are provided for filtering noise from a plurality of input signals in a sensor system. One first main input signal and several first auxiliary input signals are obtained and interior weights corresponding to the first main and auxiliary signals are determined. Thereafter, equivalent linear weights corresponding to the interior weights are determined and the equivalent linear weights are applied to second main and auxiliary input signals to filter the second main and auxiliary signals and produce one final output signal. Alternatively, the first input signals can be a subset of the second input signals such that a large set of input signals can be filtered by calculating weighting factors from a subset thereof.

13 Claims, 6 Drawing Sheets

SLAVED GRAM SCHMIDT ADAPTIVE NOISE CANCELLATION METHOD AND APPARATUS

FIELD OF THE INVENTION

The invention is directed to signal processing systems and, in particular, to signal processing systems employing an adaptive noise canceller with a slaved Gram Schmidt processor.

BACKGROUND OF THE INVENTION

Signal information received by a radar system frequently includes unwanted echoes reflected from stationary or slowly moving reflectors such as the ground or sea, or from wind driven rain or chaff. The unwanted echoes obscure desired signals—such as those reflected from a moving target. The desired signals corresponding to a moving target usually vary quickly with time. The unwanted signals corresponding to sea clutter and wind driven rain or chaff vary slowly with time. This difference can be exploited to eliminate the unwanted signals since data signals corresponding to quickly varying signals are uncorrelated as a function of time whereas slowly varying signals are correlated with time. In other words, stationary reflectors yield return echoes that include frequency components which vary more slowly than the frequency components of the desired moving target. Therefore, unwanted signals are reduced or eliminated by separating the received signals into correlated and uncorrelated components and then by filtering out the correlated components.

To this end, various systems and techniques have been devised which filter unwanted signals by isolating the correlated components of a received signal and then canceling the correlated components from the received signal. One such system is a Gram-Schmidt canceller which receives a main signal and a plurality of auxiliary signals all corresponding to the same target object. The Gram-Schmidt canceller correlates each auxiliary signal with the main signal, generates weighting factors commensurate with the degree of correlation of the signals, and uses the weighting factors to eliminate the correlated components from the main signal to thereby yield one filtered output signal. Each additional data set is processed by the Gram-Schmidt canceller and new weighting factors are generated appropriate to the new data set. Such conventional systems are described in more detail below when comparing these systems with the present invention.

Systems using a Gram-Schmidt canceller or a similar technique also include those disclosed in the following references: U.S. Statutory Invention H92 (Kretschmer et al) which discloses a moving target indicator system incorporating a Gram Schmidt processor for reducing clutter in the signal; U.S. Statutory Invention H14 (Lewis) which discloses a moving target indicator system including an adaptive noise canceller using sliding-window derived weights; U.S. Pat. No. 4,688,187 (McWhirter) which discloses a Gram-Schmidt algorithm for applying linear constraints (weighting factors) to data inputs; U.S. Pat. No. 4,652,881 which discloses a moving target indicator system using a Gram-Schmidt adaptive noise canceller to decorrelate auxiliary signals from a main signal; and U.S. Pat. No. 4,398,197 (Dillard) which discloses a digital sidelobe canceller using weighted coefficients in the noise reduction process.

SUMMARY OF THE INVENTION

In accordance with one aspect of the invention a method is provided for converting and filtering a plurality of input signals in a sensor system into one filtered output signal, the method comprising the steps of obtaining a first main input signal and a plurality of first auxiliary input signals, determining interior weights corresponding the first main and auxiliary signals, and determining equivalent linear weights corresponding to the interior weights. A second main input signal and a plurality of second auxiliary input signals are also obtained with the second main and auxiliary input signals being obtained in substantially the same noise environment as the first main and auxiliary input signals. The second main input signal is added to the product of the equivalent linear weights and the second auxiliary input signals to produce one filtered output signal corresponding to the second main and auxiliary signals.

In accordance with a further aspect of the invention, an apparatus is provided for filtering signals in a sensor system, wherein the apparatus includes: a main input channel for receiving first main input signals from a main sensor, a plurality of auxiliary input channels for receiving first auxiliary input signals from a plurality of auxiliary sensors, a Gram-Schmidt processor, connected to the first main and auxiliary input channels, for determining interior weights corresponding to the first main and auxiliary input signals, calculator means for calculating equivalent linear weights corresponding to the interior weights, and canceller means connected to the calculator means for receiving the equivalent linear weights, and connected to second main and auxiliary input channels for receiving second main and auxiliary input signals, wherein the second main and auxiliary input signals are obtained in substantially the same noise environment as the first main and auxiliary input signals, and wherein the canceller means adds the second main signal to the product of the equivalent linear weights and the second auxiliary signals, to produce a single filtered output signal corresponding to the second main and auxiliary signals.

As will be evident from the foregoing and will be discussed in more detail below, the invention is a modified Gram-Schmidt processor for use with a signal processing system having a plurality of sensors each receiving signal input corresponding to the same target or source. The signal processing system can comprise a conventional system such as a radar moving target indicator system, a sonar system, or a communication system. However, the invention can be advantageously applied to any signal receiving system which includes a plurality of signal receiving means.

To better understand how a conventional Gram-Schmidt processor is modified in accordance with the invention, it is helpful to consider the operation of such a conventional processor. As noted above, a conventional Gram-Schmidt processor receives input data signals along one main channel and a plurality of auxiliary channels. The data signals along each of the channels include desired signals generated within the same noise environment. The desired signals are assumed to be uncorrelated between data channels whereas at least a portion of the noise is correlated between data channels. A conventional Gram-Schmidt processor correlates the auxiliary data channels with the main channels and generates interior weights corresponding to the correlated components. The processor then applies the interior weights to the signals and eliminates the correlated components from the main signal to thereby eliminate correlated noise components.

Considering an exemplary application, in a typical moving target indication system, a plurality of radar antennas are employed to track one target and the data signals received along the various data channels all include dynamic signals corresponding to the same target. The signals also include relatively stationary noise components corresponding to sea clutter and wind driven rain or chaff. The dynamic target signals are typically uncorrelated between channels because the targets are quickly moving, whereas the slowly varying signals are relatively uncorrelated between signals. Hence, a conventional Gram-Schmidt processor can be advantageously used to eliminate the clutter from the moving target indication system signals. However, because of a relatively long processing time, the conventional Gram-Schmidt processor is ill-suited to large data sets. Moreover, the interior weights, once calculated, are discarded because the interior weights generated by the Gram-Schmidt processor can not be applied to any other data signal.

The present invention involves a modification of the conventional Gram-Schmidt processor wherein reusable weighting factors are generated. The reusable weighting factors, referred to as "equivalent linear weights," are generated from an initial set of signals, and thereafter are used to filter noise from other signals having similar stationary noise components. Furthermore, for processing large data sets, equivalent linear weights can be calculated from a relatively small subset of the data set, then applied to the entire data set to thereby quickly filter the entire data set. Thus, a system constructed in accordance with the invention is capable of quickly filtering data sets which are too large to be efficiently processed by a conventional Gram-Schmidt processor. In general, the equivalent linear weights can be applied to any new signals generated in the same noise environment.

Returning to the example of a moving target indication system, similar noise components appear in all signals received from the system. Since the noise environment is relatively stationary, equivalent linear weights, once generated, can be re-used to quickly filter the ground and sea clutter from new signals. It will be appreciated from the foregoing that a key advantage of the invention is in the generation of equivalent linear weights which can be applied to additional data sets. Once an appropriate set of equivalent linear weights is generated for a particular noise environment, the weights can be reused for other data sets which include the same or similar noise components.

Another advantage of the invention is in the numerically efficient implementation of the calculator means which uses systolic processing to generate equivalent linear weights. Similar hardware is used to implement both the Gram Schmidt processor means and the calculator means and therefore the invention is also hardware efficient.

Other features and advantages will be set forth in, or be apparent from, the detailed description of the preferred embodiments which follows.

DETAILED DESCRIPTION OF THE PREFERRED EMBODIMENTS

Figure 1:
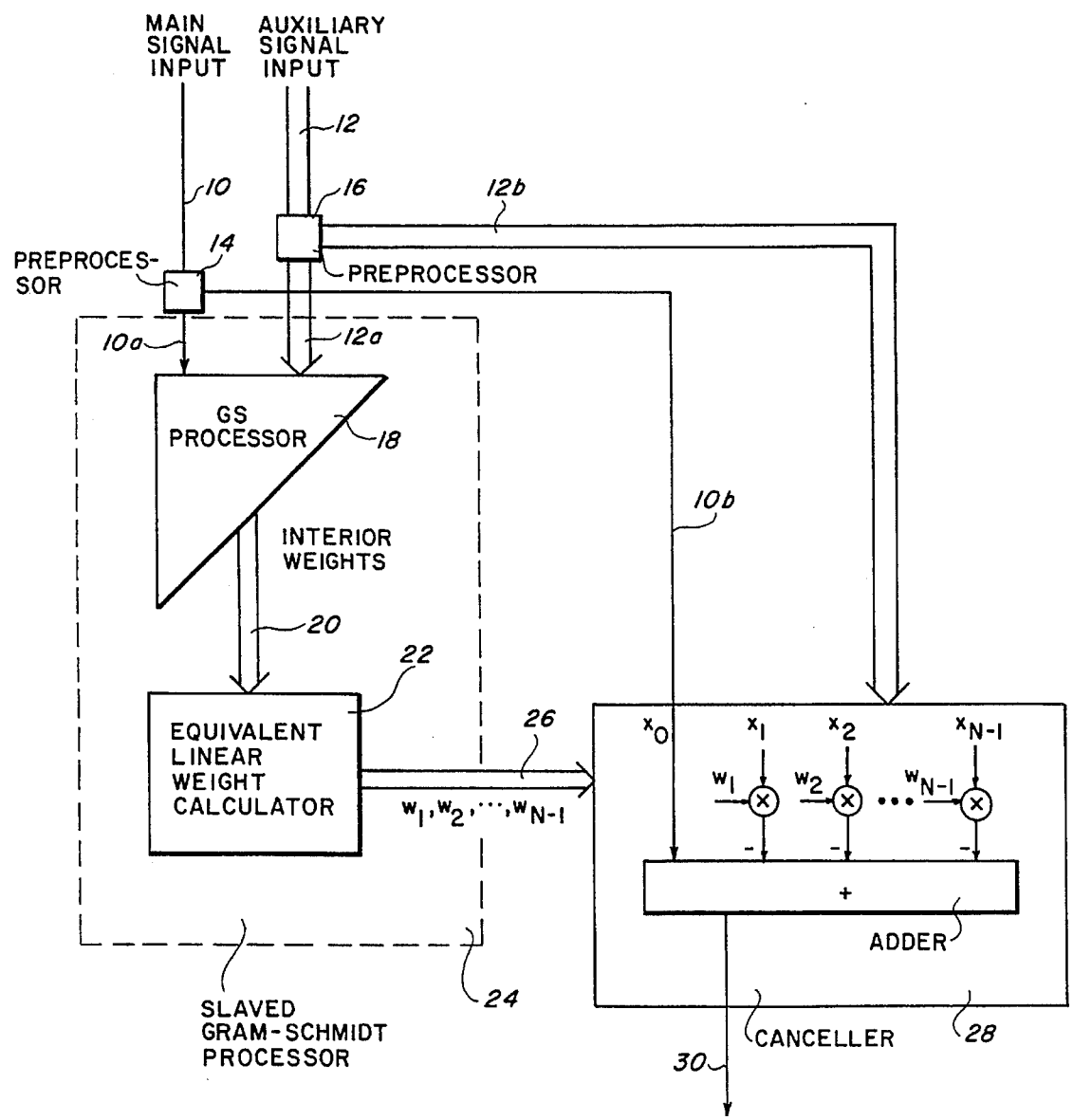
FIG. 1 is a block diagram of an adaptive processor construction in accordance with the preferred embodiment of the invention.

Referring to FIGS. 1–4, a preferred embodiment of the invention will now be described. Referring first to FIG. 1, input to the adaptive processor is received along main input data line 10 and along a plurality of auxiliary input data lines 12. The signals received along main input line 10 and auxiliary input lines 12 include quickly varying target signals having slowly varying or stationary noise components. Main input line 10 includes preprocessor 14 for processing the main input signal to produce two separate signals which appear on two datalines 10a and 10b. In particular, 10a carries only a subset of the data provided along data line 10. Likewise auxiliary input data lines are processed via preprocessor 16 into separate data lines 12a and 12b with 12a carrying a subset of the data provided along dataline 12. Preprocessors 12 and 14 are of conventional construction.

Main input line 10a and auxiliary input lines 12a are connected to a systolic Gram Schmidt processor 18 which generates interior weights corresponding to correlated stationary noise components of the main and auxiliary signals. By calculating the interior weights, systolic Gram-Schmidt processor 18 also generates a filtered output signal based on the data received along datalines 10a and 12a. This filtered output signal can optionally be output along a filtered output dataline (not shown).

In the preferred embodiment of FIG. 1, only the interior weights are output from the systolic Gram-Schmidt processor 18. The form of the interior weights and the details of systolic Gram Schmidt processor 18 are described below in connection with the description of FIGS. 2a and 2b. The interior weights are output from systolic Gram-Schmidt processor 18 through data line 20 to an equivalent linear weight calculator 22 which produces re-usable equivalent linear weights corresponding to the interior weights provided by Gram Schmidt processor 18.

The equivalent linear weights can subsequently be applied to any data set having the same noise components as the data provided along datalines 10a and 10b and therefore can be applied to the entire input data signals provided on datalines 10b and 12b. The form of the equivalent weights and the details of equivalent linear weight calculator 22 are described below in connection with the description of FIG. 4. Together systolic Gram-Schmidt processor 18 and equivalent linear weight calculator 22 comprise what is referred to as a slaved Gram-Schmidt processor and is denoted 24 in FIG. 1.

The equivalent weights produced by equivalent linear weight calculator 22 are output along data lines 26 to a canceller 28 which also receives the entire main and auxiliary input signals along datalines 10b and 12b. Canceller 28 weights the auxiliary input signals from dataline 12b by the equivalent linear weights and combines the weighted auxiliary input signals with the main input signal from dataline 10b to produce a filtered output signal which is output along output data line 30. The function of canceller 28 is detailed below.

Thus, the entire dataset received along input datalines 10 and 12 is filtered using equivalent linear weights calculated from only a subset of the original dataset. Therefore, in use, if an input dataset is too large to be efficiently filtered by systolic Gram-Schmidt processor 18, splitters 14 and 16 are set to allow, for example, a subset of one out of every five data points to be passed into datalines 10a and 10b, such that equivalent linear weights are calculated from one fifth of the total dataset, then applied to filter the entire dataset.

Figure 2A:
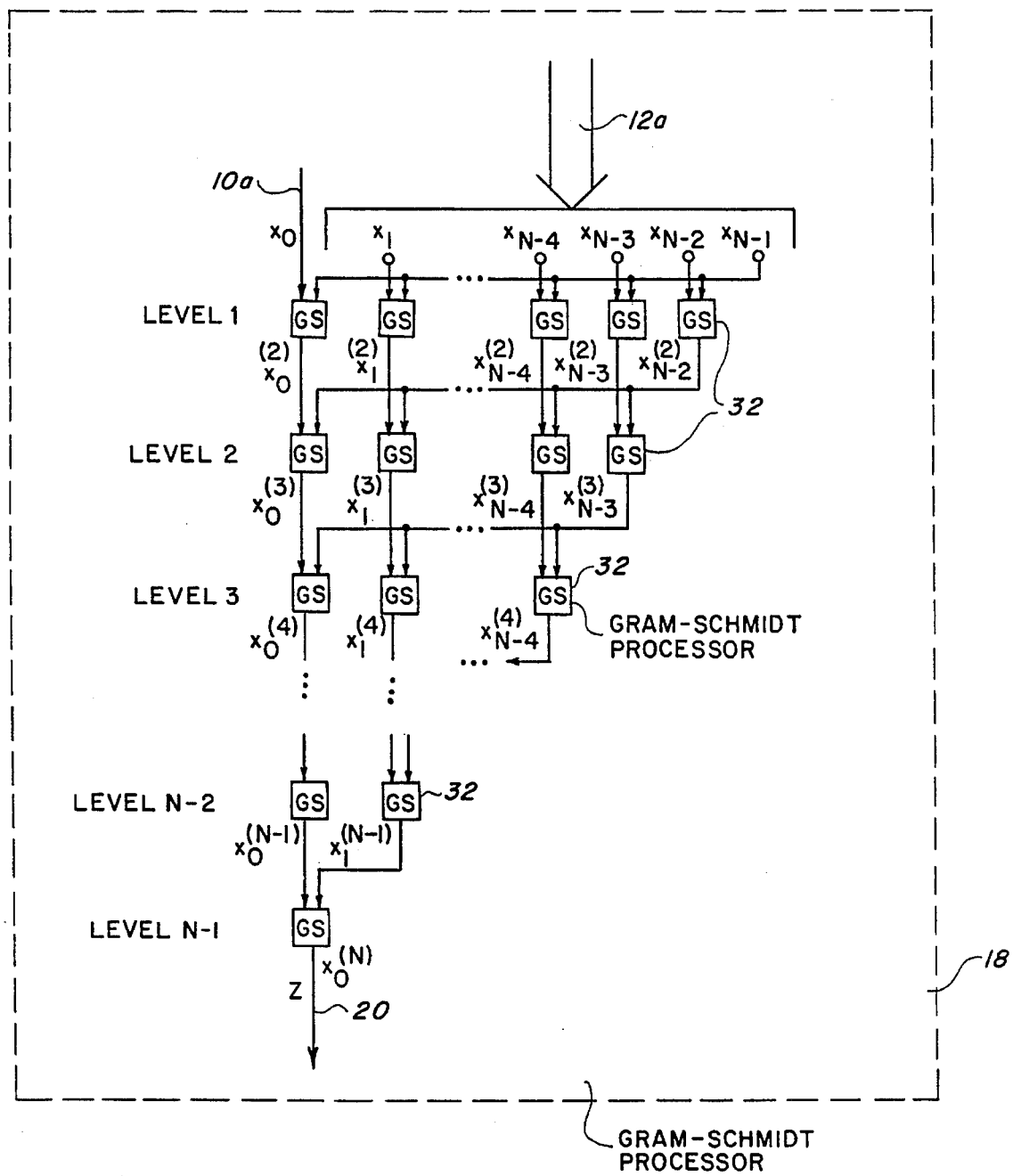
FIG. 2(a) is a block diagram of the Gram-Schmidt processor of the invention.
Figure 2B:
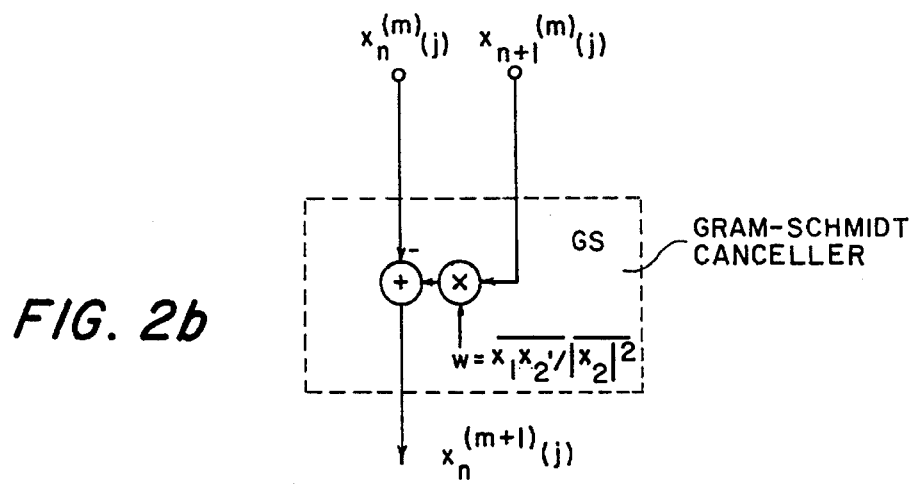
FIG. 2(b) is a block diagram of the two input Gram-Schmidt canceller of the invention.

Referring to FIGS. 2(a) and 2(b), a detailed description of the systolic Gram-Schmidt processor 18 will now be provided. A block diagram of Gram-Schmidt processor 10 is provided in FIG. 2(a) wherein $x_0, x_1, \ldots, x_{N-1}$ represent the complex data in the 0th, 1st, . . . , N–1th channels, respectively. The main signal channel input of dataline 10a is represented by $x_0$ and the remaining N–1 inputs are the auxiliary channels input on dataline 12a.

The main channel signal consists of a desired signal along with stationary noise signals. Cancellation of the stationary noise signals is achieved by correlating the simultaneously received signals in the main and auxiliary channels. Noise which is uncorrelated between channels is not filtered by this system.

Gram Schmidt processor 18 operates to individually decorrelate each auxiliary input from all other inputs by using a plurality of two-input Gram-Schmidt cancellers 32 arranged in a hierarchy of levels. One such two-input Gram-Schmidt canceller 32 is shown schematically in FIG. 2(b), and will described in more detail below. As shown in FIG. 2(a), $x_{N-1}$ is decorrelated with $x_0, x_1, \ldots x_{N-2}$ in the first level of decomposition yielding $x_0^{(2)}, x_1^{(2)}, \ldots x_{N-2}^{(2)}$. Next, $x_{N-2}^{(2)}$ is decorrelated with $x_0^{(2)}, \ldots x_1^{(2)}, \ldots x_{n-3}^{(2)}$. This decorrelation process continues until one output channel remains $(x_0^{(N)})$. However, the output channel is not totally decorrelated with the input because the interior weights in each of the two-input Gram-Schmidt cancellers 32 are computed from a finite number of input samples rather than an infinite number. Thus, the interior weights are generated by this technique are estimates of optimal interior weights.

The systolic Gram-Schmidt processor 18 processes data on a point by point basis, with interior weights estimated at each time step. The interior weights are calculated according to a fixed number of previous samples at any given point in time. For each time step the latest sample is included and the oldest sample is discarded.

The operation of systolic Gram-Schmidt processor 18 is described mathematically as follows. For an indexed time instant j, $$x_n(j)=[x_n(j),x_n(j-1), \ldots x_n(j-K+1)]^T, n=0, 1, 2, \ldots N-1 \quad (1)$$

where K is the number of samples used to calculate each of the interior weights and T denotes the vector transpose operation. Gram Schmidt cancellers 32 are arranged in N–1 levels, each receiving input from the previous level as shown in FIG. 2(a). The input vectors of an mth level of Gram-Schmidt canceller 32 are $x_n^{(m)}(j)$ and $x_{n+1}^{(m)}(j)$, where $$x_n^{(m)}(j)=[x_n^{(m)}(j), x_n^{(m)}(j-1), \ldots x_n^{(m)}(j-k+1)]^T, \quad (2)$$

where $x_n^{(1)}(j)=x_n(j)$ and $x_n^{(1)}(j)=x_n(j)$. The output of each two-input Gram-Schmidt canceller 32 at the (m+1) level is:

$$x_n^{(m+1)}(j) = x_n^{(m)}(j) - w_n^{(m)}(j) \, x_{N-m}^{(m)}(j), \quad (3)$$

$n = 0, 1, \ldots, N - m - 1$
$m = 1, 2, \ldots, N - 1$ where $$w_n^{(m)}(j) = \frac{x_{N-m}^{(m)t}(j) \, x_n^{(m)}(j)}{x_{N-m}^{(m)t}(j) \, x_{N-m}^{(m)}(j)}, \quad (4)$$

't' denotes the conjugate vector transpose operation, and $w_n^{(m)}(j)$ is the interior weight.

The interior weights are not time aligned estimates because of the effect of systolic processing, rather the interior weights at any level of systolic Gram-Schmidt processor 18 are one time step ahead of the interior weights at a successive level.

Figure 3:
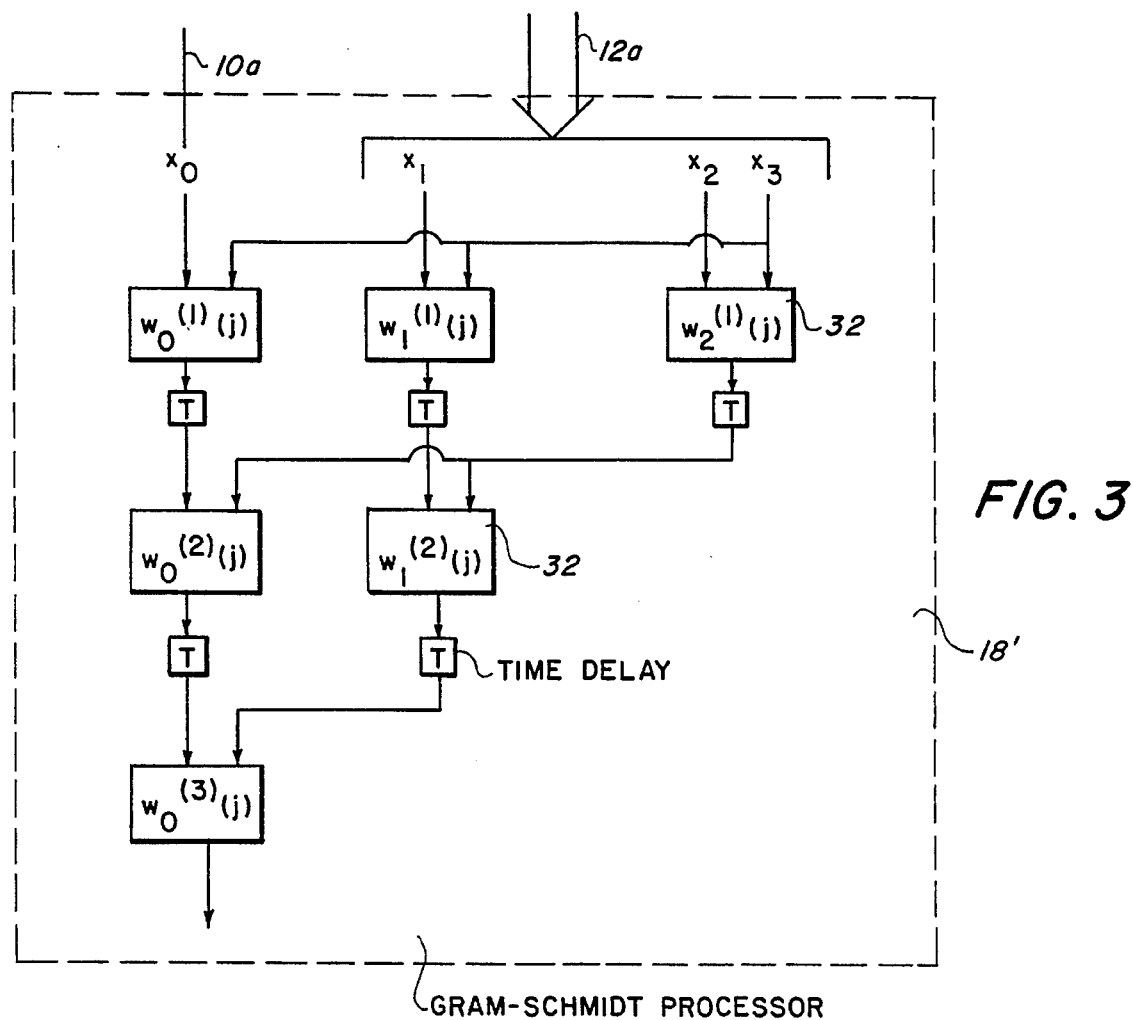
FIG. 3 is a block diagram of an exemplary embodiment of the Gram-Schmidt processor having three auxiliary input lines.

FIG. 3 provides a schematic diagram of an exemplary embodiment of systolic Gram-Schmidt processor 18 with N=4 wherein for clarity only the internal weights are shown. Time delay, T, is the systolic step time The term $w_n^{(m)}$ represents the steady state value of $w_n^{(m)}(j)$ corresponding to an infinite number of samples per channel, and hence $w_n^{(m)}$ represents the optimal weight. In prior art Gram-Schmidt processor these interior weights are not saved, rather the interior weights are merely used as intermediate values for generating a filtered output signal. Hence, in prior art systems, the interior weights are discarded after each level of the Gram-Schmidt processor. Here, however, the interior weights are not discarded but are transferred along dataline 26 to equivalent linear weight calculator 22 for conversion into equivalent linear weights.

Referring to FIG. 4, the equivalent linear weight calculator will now be described. For each set of interior weights, equivalent linear weights, $W_1, W_2, \ldots, W_{N-1}$, corresponding to the interior weights are generated as follows:

$$W_1 = w_0^{(N-1)} \quad (5)$$

$$W_2 = w_0^{(N-2)} - w_1^{(N-2)} W_1$$

$$W_3 = w_0^{(N-3)} - w_1^{(N-3)} W_1 + w_2^{(N-3)} W_2$$

$$\vdots$$

$$W_{N-1} = w_0^{(1)} - w_1^{(1)} W_1 + w_2^{(1)} W_2 -$$

$$\ldots (-1)^{N-2} w_{N-2}^{(1)} W_{N-2}$$

Because the interior weights calculated by systolic Gram-Schmidt processor 18 are not time-aligned, the equivalent linear weights are computed by using time delayed estimates of the interior weights, or $$W_1(j) = w_0^{(N-1)}(j) \quad (6)$$

$$W_2(j) = w_0^{(N-2)}(j-1) - w_1^{(N-2)}(j-1) \, W_1(j)$$

$$W_3(j) = w_0^{(N-3)}(j-2) - w_1^{(n-3)}(j-2) \, W_1(j) +$$

$$w_2^{(N-2)}(j-2) \, W_2(j)$$

$$\vdots$$

$$W_{N-1}(j) = w_0^{(1)}(j-N+2) - w_1^{(1)}(j-N-2) W_1(j) \ldots$$

$$(-)^{N-2} w_{N-2}^{(1)}(j-N+2) W_{N-2}(j).$$

Figure 4A:
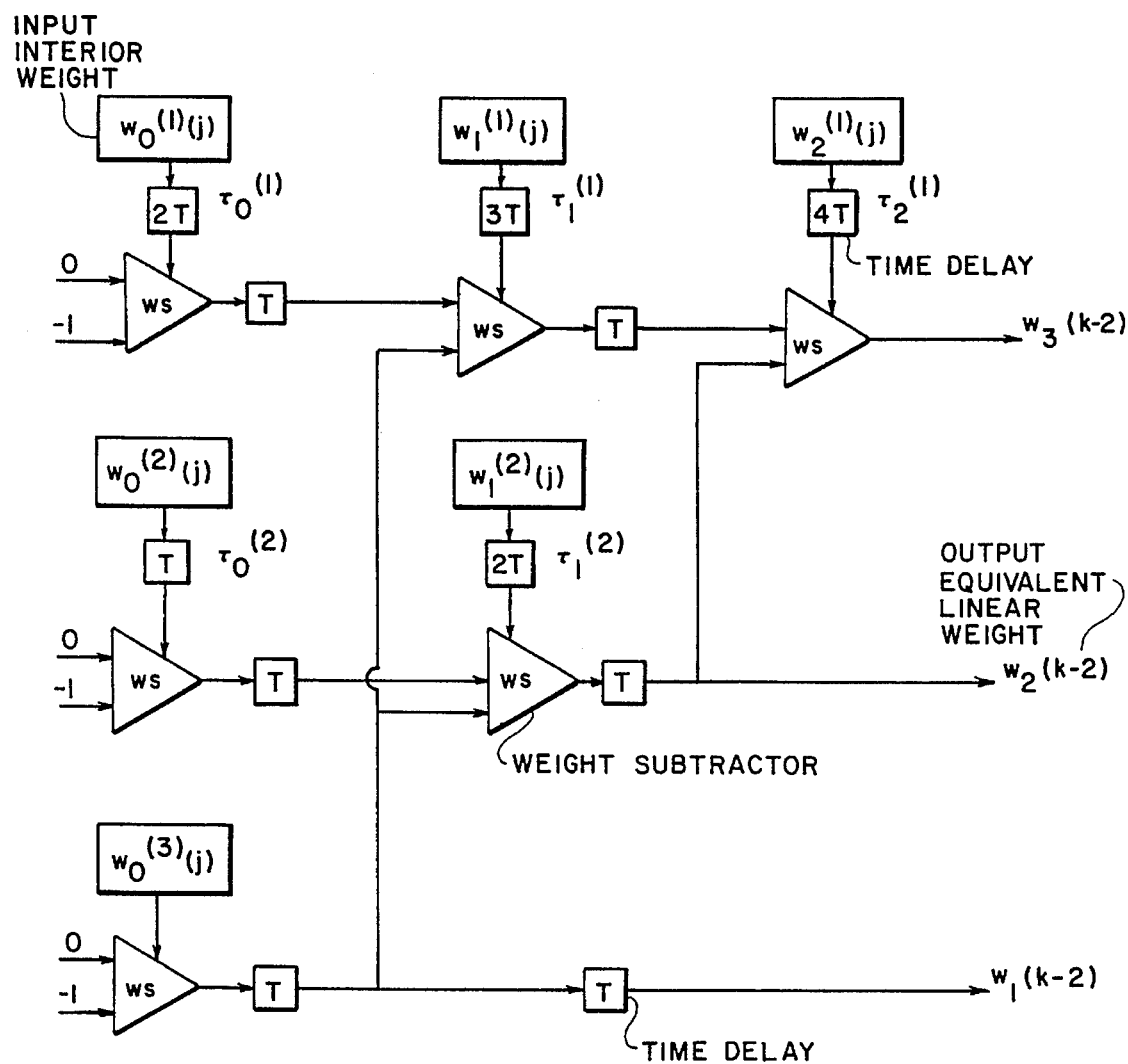
FIG. 4a is a block diagram of an exemplary embodiment of the equivalent linear weight calculator of the invention.

FIG. 4a shows a functional block diagram of an exemplary embodiment of equivalent linear weight calculator 22 with N=4. Similarly to systolic Gram-Schmidt processor 18, the equivalent linear weight calculator 22 works on a clocked basis where data is calculated and transferred at a clock rate denoted by T. The equivalent linear weight calculator 22 implements the equations for the equivalent linear weights given in Equation (5). Gram-Schmidt interior weights at time instant j, $w_n^{(m)}(j)$, are input into the equivalent linear weight calculator 22. These inputs are appropriately time delayed by $\tau_n^{(m)}$, where:

$$\tau_n^{(m)} = (N-1-m+n)T \qquad (7)$$

Figure 4B:
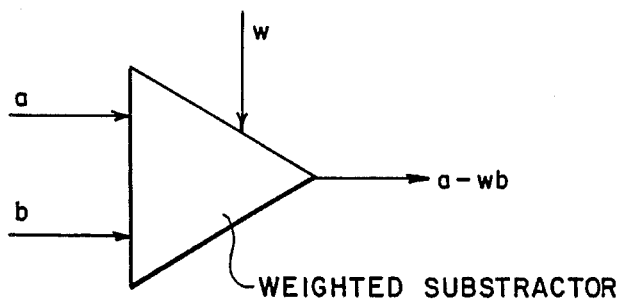
FIG. 4b is a block diagram of the weighted subtractor of the invention.

Equivalent linear weight calculator 22 includes a plurality of weighted subtractors 50. As shown in FIG. 4b with exemplary input "a" "b" and "w" input "b" to each weighted subtractor is weighted by w and subtracted from input "a".

In an alternative embodiment (not shown) of the equivalent linear weight calculator 22, the first column of weighted subtractors 50 shown in FIG. 4a are not used, rather the output of the $\tau_n^{(m)}$ delay is directly connected to the T delay. This achieves the same result as the embodiment of FIG. 4a since the input to each first column weighted subtractor 50 is 0 and −1, and therefore the output of each first column weighted subtractor is identical to the input weight.

Returning to the preferred embodiment of FIG. 1, the equivalent linear weights $W_1, W_2, \ldots, W_{N-1}$ are transferred along dataline 26 to canceller 28 and applied to the auxiliary signals. The entire main and auxiliary input datasets are also received by canceller 28 along datalines 10b and 12b respectively. Canceller 28 generates a filtered output signal, z, by numerically solving the equation:

$$z = x_0 - W_1 x_1 - W_2 x_2 \ldots W_{N-1} x_{N-1} \qquad (8)$$

To solve equation (8), canceller 28 multiplies each auxiliary data point by the corresponding equivalent linear weight then subtracts the net result from the main dataline points, yielding the filtered signal output along dataline 30.

Thus, the preferred embodiment of FIGS. 1–4 generates one filtered output signal from a plurality of input signals by first calculating noise-filtering weighting factors from a subset of the input signals, then applying the weighting factors to the entire input signals.

Figure 5:
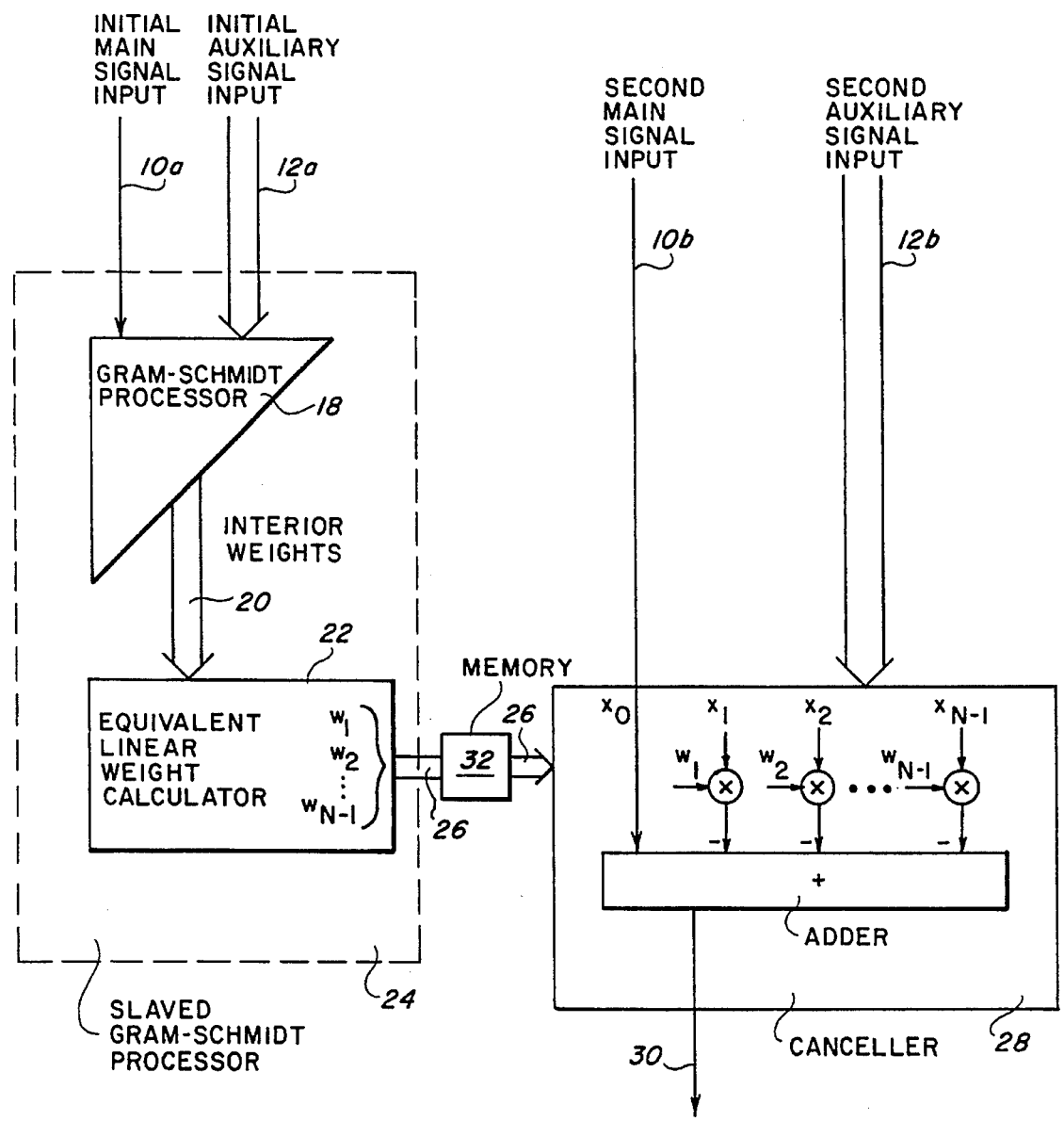
FIG. 5 is a block diagram of an alternative embodiment of the adaptive processor of FIG. 1.

A block diagram of an alternative embodiment of the invention is provided in FIG. 5. The embodiment of FIG. 5 is similar to the embodiment of FIG. 1, with the addition of a memory 32 connected to canceller 28 and the provision for separate input lines 10a, 10b, 12a and 12b without preprocessors 14 and 16. As described above in the summary of the invention, equivalent linear weights from an initial dataset, once calculated, can be applied to any new datasets having the same noise components as the initial dataset. The embodiment of FIG. 6 exploits this capability.

The embodiment of FIG. 5 uses memory 32, which are of conventional design, in storing the equivalent linear weights received along dataline 26. In use, an initial dataset is input along datalines 10a and 10b and equivalent linear weights are generated corresponding thereto. New datasets, having the same or similar noise components as the initial set, are received along datalines 10b and 12b. The stored equivalent weights are then used to filter the new datasets. Cancellation is accomplished in the same manner as described above for FIG. 1.

Optionally, memory 32 can be used to store a plurality of equivalent linear weight sets corresponding to a plurality of noise environments. A selector circuit, not shown, can be provided to choose a particular set of equivalent linear weights to filter signals received in the corresponding noise environment.

Figure 6:
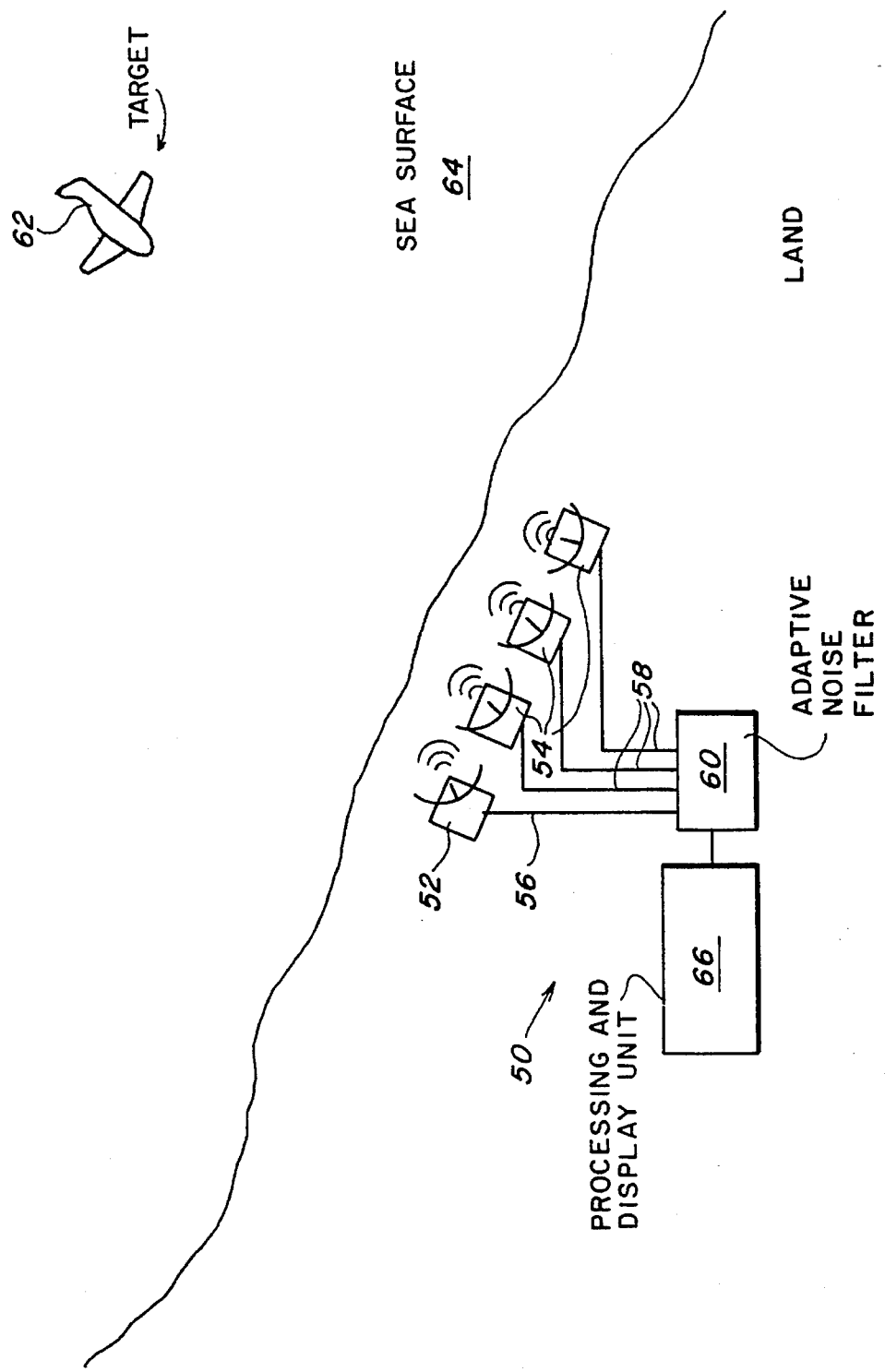
FIG. 6 is a schematic representation of target overflying terrain including water and land mass and illustrates an application of the invention as part of a multiple-radar moving target indicator system.

FIG. 6 shows an exemplary system in which the invention can be advantageously employed. A multiple-radar moving target indicator system 50 includes an adaptive noise filter 60 constructed in accordance with either the preferred or alternative embodiments as described above. A main input channel 56 and a plurality of auxiliary input channels 58 carry signals received from a main radar antenna 52 and a plurality of auxiliary antennas 54, respectively, to adaptive noise filter 60. The moving target indicator system 50 further includes a signal processing and display unit 66 which is of conventional design and will not be described further. Radar returns from target 62 are partially obscured by radar echoes received from sea surface 64. Adaptive noise filter 60 operates, as described above, to eliminate the unwanted sea clutter radar echoes to thereby yield a noise-free signal corresponding to target 62.

Although the invention has been described with respect to exemplary embodiments thereof, it will be understood by those skilled in the art that variations and modifications can be effected in these exemplary embodiments without departing from the scope and spirit of the invention.

I claim:

1. A method for converting a filtering a plurality of input signals in a sensor system into one filtered output signal, said method comprising the steps of:

obtaining a first main input signal, and a plurality of first auxiliary input signals, determining interior weights corresponding to said first main and auxiliary input signals, determining equivalent linear weights corresponding to said interior weights, obtaining a second main input signal and a plurality of second auxiliary input signals, said second main and auxiliary signals being obtained in substantially the same noise environment as said first main and auxiliary signals, and adding said second main signal to the product of said equivalent linear weights and said second auxiliary input signals to thereby produce one filtered output signal corresponding to said second main and auxiliary signals, and wherein said first main and auxiliary input signals are a subset of said second main and auxiliary input signals, respectively.

2. The method of claim 1, wherein said first main and auxiliary input signals are equal to said second main and auxiliary input signals, respectively.

3. An apparatus for converting and filtering a plurality of input signals in a sensor system into one filtered output signal, said apparatus comprises:

a first main input channel for receiving a first main input signal from a main sensor, a plurality of first auxiliary input channels for receiving first auxilliary input signals from a plurality of auxiliary sensors, Gram-Schmidt processor means, connected to said first main and auxiliary input channels, for determining interior weights corresponding to said first main and auxiliary input signals, calculator means connected to said Gram-Schmidt processor means for receiving said interior weights from said Gram-Schmidt processor means and for calculating the equivalent linear weights corresponding to said interior weights, a second main input channel for receiving a second main input signal from said main sensor, a plurality of second auxiliary input channels for receiving second auxiliary input signals from said auxiliary sensors, canceller means, connected to said calculator means to receive said equivalent linear weights and connected to said second main and auxilliary input channels to receive said second main and auxiliary input signals, for adding said second main signal to the product of said equivalent linear weights and said second auxiliary signals to produce one filtered output signal corresponding to said second main and auxiliary input signals, and wherein said first main and auxiliary input signals are a subset of said second main and auxiliary input signals, respectively.

4. The apparatus of claim 3, wherein said sensor system comprises a moving target indicator system and said main radar sensor and said plurality of auxiliary radar sensors comprise radar antennas for receiving radar echo signals.

5. The apparatus of claim 3, wherein said first main and auxiliary input signals are equal to said second main and auxiliary input signals, respectively.

6. A method for converting and filtering a plurality of input signals in a sensor system into one filtered output signal, said method comprising the steps of:

obtaining a first main input signal, and a plurality of first auxiliary input signals, determining interior weights corresponding to said first main and auxiliary input signals, wherein said interior weights satisfy the equation:

$$w_n^{(m)}(j) = x_{N-m}^{(m)t}(j) \, x_n^{(m)}(j) / x_{N-m}^{(m)t}(j) \, x_{N-m}^{(m)}(j),$$

where n=0,1, ... , N−m−1

$$x_n^{(m+1)}(j) = x_n^{(m)}(j) - w_n^{(m)}(j) \, x_{N-m}^{(m)}(j),$$

m=1,2, ... , N−1

't' denotes the conjugate vector transpose operation, $x_0^{(1)}(j)$ denotes said main input signal, $x_1^{(1)}(j)$, $x_2^{(1)}(j)$, ..., $x_{N-1}^{(1)}(j)$, denote said auxilliary input signals, "j" is a time index and N is an integer greater than 1, determining equivalent linear weights corresponding to said interior weights, wherein said equivalent linear weights satisfy the equations:

$$W_1 = w_0^{(N-1)}$$

$$W_2 = w_0^{(N-2)} - w_1^{(N-2)} W_1$$

$$W_3 = w_0^{(N-3)} - w_1^{(N-3)} W_1 + w_2^{(N-3)} W_2$$

$$W_{N-1} = w_0^{(1)} - w_1^{(1)} W_1 + w_2^{(1)} W_2 - \ldots (-1)^{N-2} w_{N-2}^{(1)} W_{N-2}.$$

obtaining a second main input signal and a plurality of second auxiliary input signals wherein said second main and auxiliary signals are obtained in substantially the same noise environment as said first main and auxiliary signals, producing one filtered output signal z, wherein z satisfies the equation:

$$z = y_0 - W_1 y_1 - W_2 y_2 \ldots W_{N-1} y_{N-1}$$

and $y_0$ denotes said second main input signal and $y_1$, $y_2$, ..., $y_{N-1}$ denote said second auxiliary input signals.

7. The method of claim 6, further comprising storing said equivalent linear weights in a memory.

8. The method of claim 6, wherein said first main and auxiliary input signals are equal to said second main and auxiliary input signals, respectively.

9. The method of claim 6, wherein said first main and auxiliary input signals are a subset of said second main and auxiliary input signals, respectively.

10. An apparatus for converting and filtering a plurality of input signals in a sensor system into one filtered output signal, said apparatus comprises:

a first main input channel for receiving a first main input signal from a main sensor, a plurality of first auxiliary input channels for receiving first auxiliary input signals from a plurality of auxiliary sensors, Gram-Schmidt processor means, connected to said main and auxiliary input channels, for determining interior weights corresponding to said main and auxiliary input signals, wherein said interior weights satisfy the equation:

$$w_n^{(m)}(j) = x_{N-m}^{(m)t}(j) \, x_n^{(m)}(j) / x_{N-m}^{(m)t}(j) \, x_{N-m}^{(m)}(j),$$

where n=0,1, ... , N−m−1

$$x_n^{(m+1)}(j) = x_n^{(m)}(j) - w_n^{(m)}(j) \, x_{N-m}^{(m)}(j),$$

m=1,2, ... , N−1

't' denotes the conjugate vector transpose operation, $x_0^{(1)}(j)$ denotes said main input signal, $x_1^{(1)}(j)$, $x_2^{(1)}(j)$, ..., $x_{N-1}^{(1)}(j)$, denote said auxiliary input signals, "j" is a time index and N is an integer greater than 1, calculator means connected to said Gram-Schmidt processor means for receiving said interior weights from said Gram-Schmidt processor means and for calculating the equivalent linear weights corresponding to said interior weights, wherein said equivalent linear weights satisfy the equation:

$$W_1 = w_0^{(N-1)}$$

$$W_2 = w_0^{(N-2)} - w_1^{(N-2)} W_1$$

$$W_3 = w_0^{(N-3)} - w_1^{(N-3)} W_1 + w_2^{(N-3)} W_2$$

$$W_{N-1} = w_0^{(1)} - w_1^{(1)} W_1 + w_2^{(1)} W_2 - \ldots (-1)^{N-2} w_{N-2}^{(1)} W_{N-2}.$$

a second main input channel for receiving a second main input signal from said main sensor, a plurality of second auxiliary input channels for receiving second auxiliary input signals from said auxiliary sensors, canceller means, connected to said calculator means to receive said equivalent linear weights, and connected to said second main and auxiliary input channels to receive said second main and auxiliary input signals, for producing one filtered output signal z, wherein z satisfies the equation:

$$z = y_0 - W_1 y_1 - W_2 y_2 \ldots W_{N-1} y_{N-1}$$

and $y_0$ denotes said second main input signal and $y_1$, $y_2$, ..., $y_{N-1}$ denote said second auxiliary input signals.

11. The apparatus of claim 10, wherein said sensor system comprises a moving target indicator system and said main radar sensor and said plurality of auxiliary radar sensors comprise radar antennas for receiving radar echo signals.

12. The apparatus of claim 10, wherein said first main and auxiliary input signals are equal to said second main and auxiliary input signals, respectively.

13. The apparatus of claim 10, wherein said first main and auxiliary input signals are a subset of said second main and auxiliary input signals, respectively.

* * * * *